March 5, 1957

V. J. KOMUCHAR ET AL 2,783,901

SELF-UNLOADING VEHICLE

Filed Oct. 7, 1954

INVENTORS
VICTOR J. KOMUCHAR
DARYL D. CERNY

Paul O. Pippes

ATTORNEY

INVENTORS
VICTOR J. KOMUCHAR
DARYL D. CERNY
Paul O. Pippel
ATTORNEY

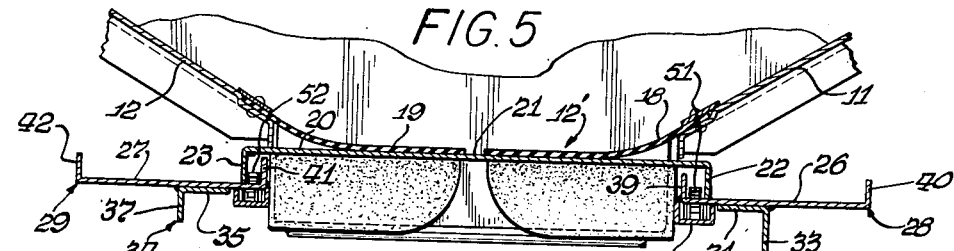
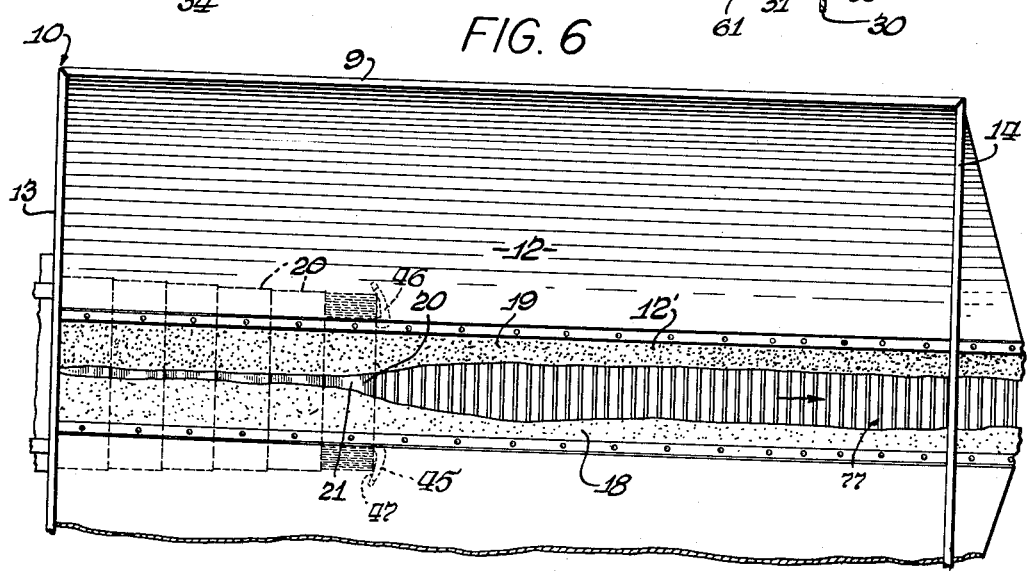
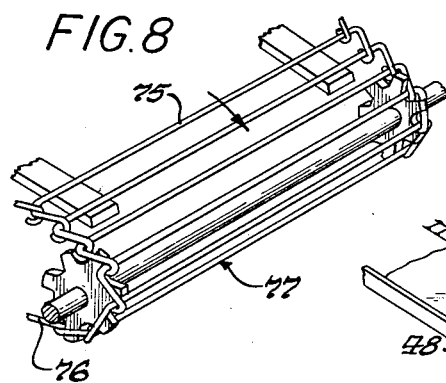
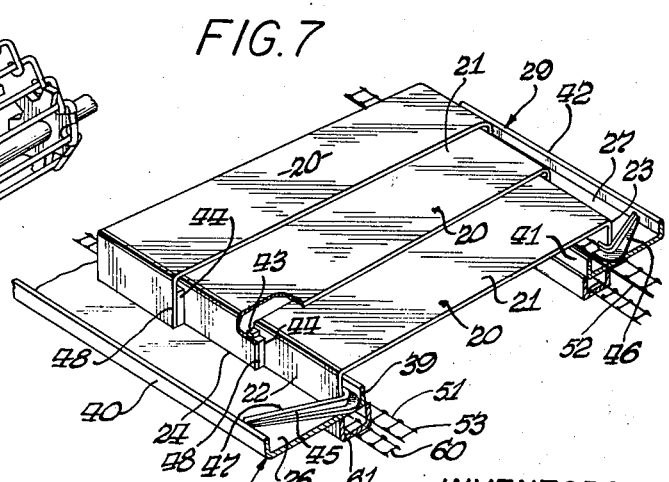
INVENTORS
VICTOR J. KOMUCHAR
DARYL D. CERNY
ATTORNEY

INVENTORS
VICTOR J. KOMUCHAR
DARYL D. CERNY
ATTORNEY

March 5, 1957
V. J. KOMUCHAR ET AL
2,783,901
SELF-UNLOADING VEHICLE
Filed Oct. 7, 1954
5 Sheets-Sheet 5
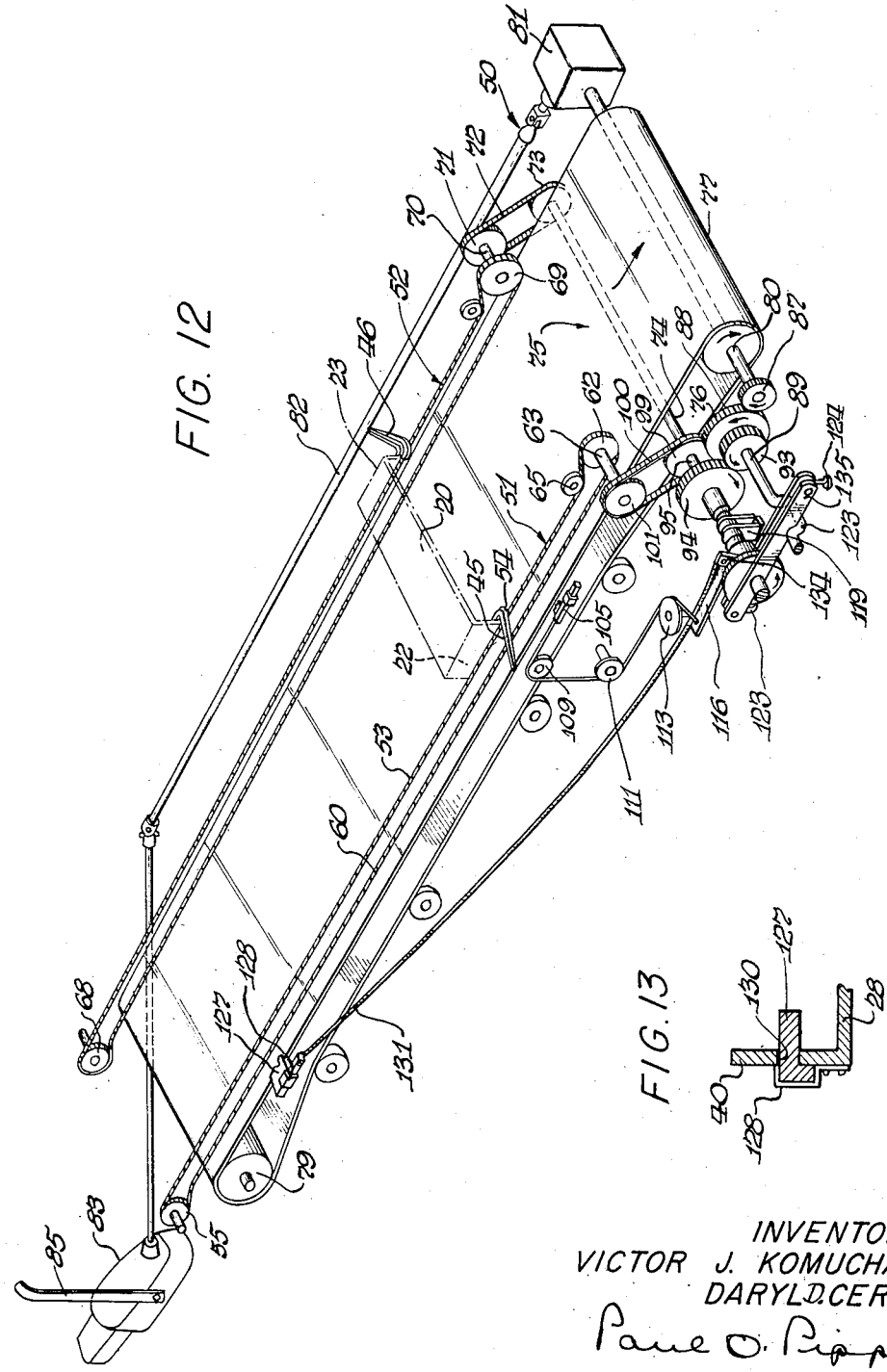
INVENTORS
VICTOR J. KOMUCHAR
DARYL D. CERNY
Paul O. Pippel
ATTORNEY United States Patent Office 2,783,901
Patented Mar. 5, 1957

2,783,901

SELF-UNLOADING VEHICLE

Victor J. Komuchar, Palos Park, and Daryl D. Cerny, Oaklawn, Ill., assignors to International Harvester Company, a corporation of New Jersey Application October 7, 1954, Serial No. 460,911

4 Claims. (Cl. 214—83.2)

This invention relates to self-unloading vehicles, and more particularly, to a type which is especially adapted to unload delicate bruisable crops, such as potatoes.

The principal object of the invention is to provide a novel self-unloading vehicle incorporating a sectional bottom which opens increments of the bottom to unload the crops from one end of the vehicle box to the other without excessive tumbling or abrasion.

A more specific object of the invention is to provide such a novel bottom closure arrangement which incorporates a series of telescoping sections arranged in a simple and efficient manner in order to sustain the load of crops in the box, and at the same time, operate with minimum bruising and skinning effect on the crops.

A more specific object of the invention is to provide such a sectional bottom incorporating a novel mechanism for opening and closing the bottom automatically.

These and other objects of the invention will become more apparent from the specification and the drawings, wherein:

Figure 5 is a further transverse vertical sectional view taken substantially on the line 5—5 of Figure 1;

Figure 6 is a further fragmentary plan view illustrating the bottom partially open;

Figure 7 is a fragmentary perspective view of a portion of the telescoping bottom closure section;

Figure 8 is a fragmentary perspective view of the rear end of the conveyor;

Figure 12 is a diagrammatic perspective view of the drive for the mechanism; and Figure 13 is a transverse vertical sectional view taken substantially on the line 13—13 of Figure 11.

Figure 1:
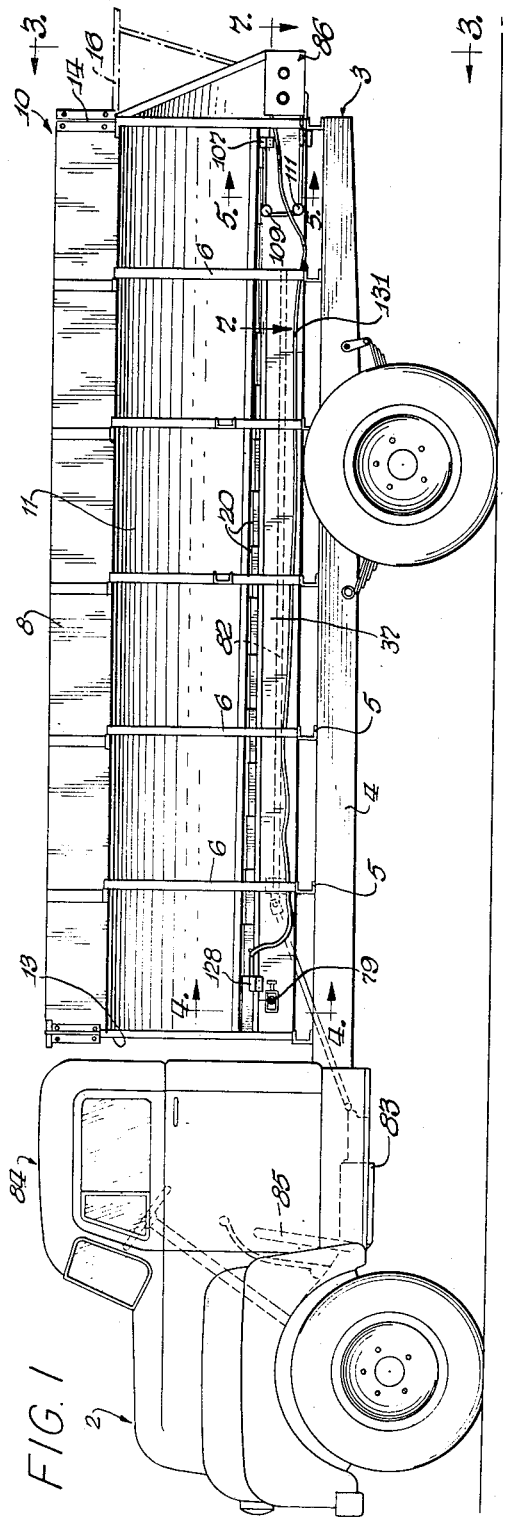
Figure 1 is a side-elevational view of a vehicle incorporating the invention.
Figure 3:
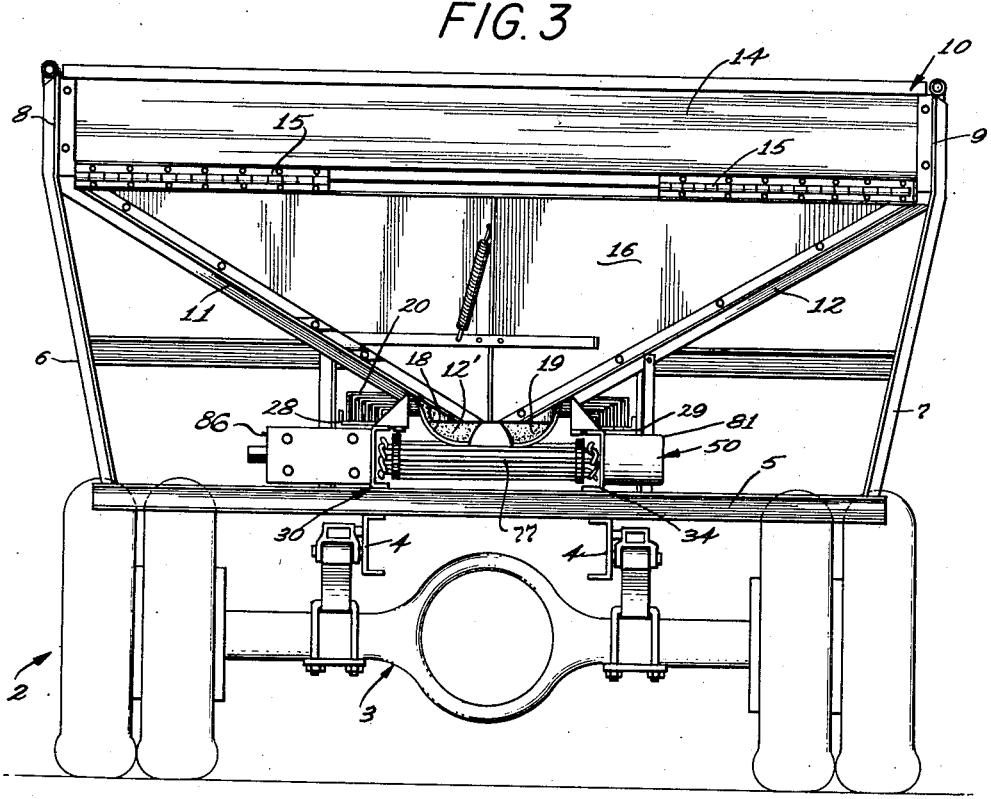
Figure 3 is a rear end view taken substantially on the line 3—3 of Figure 1.

Describing the invention in detail, the vehicle, generally designated 2, comprises a wheeled chassis 3 which incorporates a pair of longitudinal side sill members 4 which are interconnected by a plurality of overlying cross-beam members 5, 5, each of the cross-beam members extending laterally outwardly of the side sill members, and at their outer extremities supporting the lower ends of a plurality of uprights 6, 7 which at their upper ends embrace the sides 8, 9 of the box, or receptacle, generally designated 10. The sides 8 and 9 have downwardly converging lower portions 11 and 12, respectively, which define between their lower edges a bottom discharge opening, or passage, 12' extending lengthwise longitudinally of the box from the front to the rear walls 13 and 14 thereof, the walls 13 and 14 interconnecting the sides 8 and 9, and the wall 14 terminating at its lower edge above the inclined portions 11 and 12 of the side walls and hinged, as at 15 (Figure 3), to the upper end of a gate 16 which is adapted to be propped up, as shown in Figure 1, in order to open the rear end of the box, or be closed, as shown in Figure 3.

The lower margins of the converging side wall portions 11 and 12 are provided with flexible guides 18 and 19, respectively, which extend over the discharge slot 12' the full length thereof, and overlie a plurality of closure members 20, 20.

Figure 4:
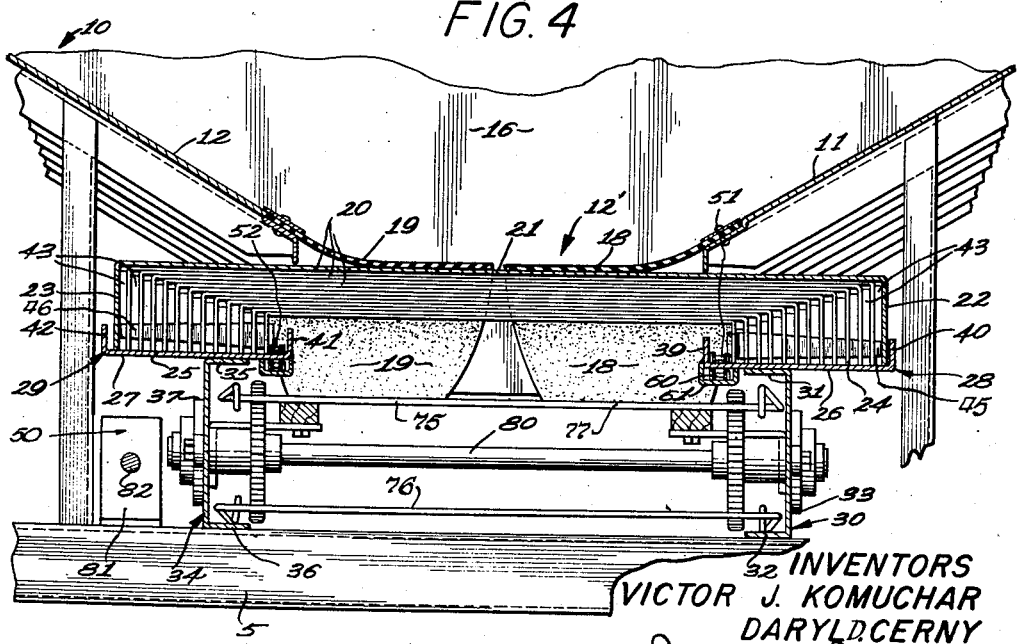
Figure 4 is a vertical sectional view taken approximately on the line 4—4 of Figure 1.

It will be observed from a consideration of Figures 4, 5, and 7 that each closure member 20 is U-shaped in cross section, each comprising a horizontal upper plate portion 21 which extends transversely of the opening 12' beyond the lateral margins thereof, and the opposite ends of each plate, or support, portion 21 are integrally united with depending leg, or flange, portions 22 and 23 which at their lower edges 24 and 25 ride respectively on the upper sides of horizontal walls 26 and 27 of longitudinal guides and supports, or channel members, generally indicated 28 and 29, the channel members 28 and 29 underlying the sides 11 and 12, respectively, and spaced vertically therefrom, and the channel 28 being carried on a longitudinal beam, or support, member 30 which is of U-shaped construction, and comprising top and bottom flanges 31 and 32 and an interconnecting outboard wall 33, the upper flange 31 seating against the underside of the wall 26 and connected thereto, preferably as by welding, and the lower flange 32 seating atop the cross-beam members 5 and connected thereto, preferably as by welding. Similarly, the channel member 29 is supported on a longitudinal support beam, or channel member, 34 which has upper and lower flanges 35 and 36, the former seating against the underside of the horizontal wall 27 of the beam member 29, and connected thereto, preferably as by welding, and the flange 36 seating and connected, as by welding to the beam members 5, the member 34 also providing an outboard wall 37. The guiding support 28 is provided with inboard and outboard upright flanges 39 and 40 along the longitudinal edges of the wall portion 26, and similarly, the member 29 is provided with inboard and outboard upstanding flanges 41 and 42 formed integral with the longitudinal edges of the wall portion 27 of said beam member 29. These flanges 39 and 40 confine the leg portions 22 of the sectional closure members 20, and the flanges 41 and 42 laterally confine the portions 23 of said closure members.

It will be readily understood from a consideration of the drawings that each member 20 initiating from the rearwardmost one to the forwardmost telescope within one another lengthwise of slot 12', as best seen in Figures 4 and 7, and the forward ends of the legs 22 and 23 are provided with external, outwardly projecting stops, or abutments, 43 which hook behind the internal inwardly projecting stops, or abutments, 44 on the rear extremities of the legs 22 and 23 of the telescoping section forwardly thereof, as respects the front end of the box.

Figure 2:
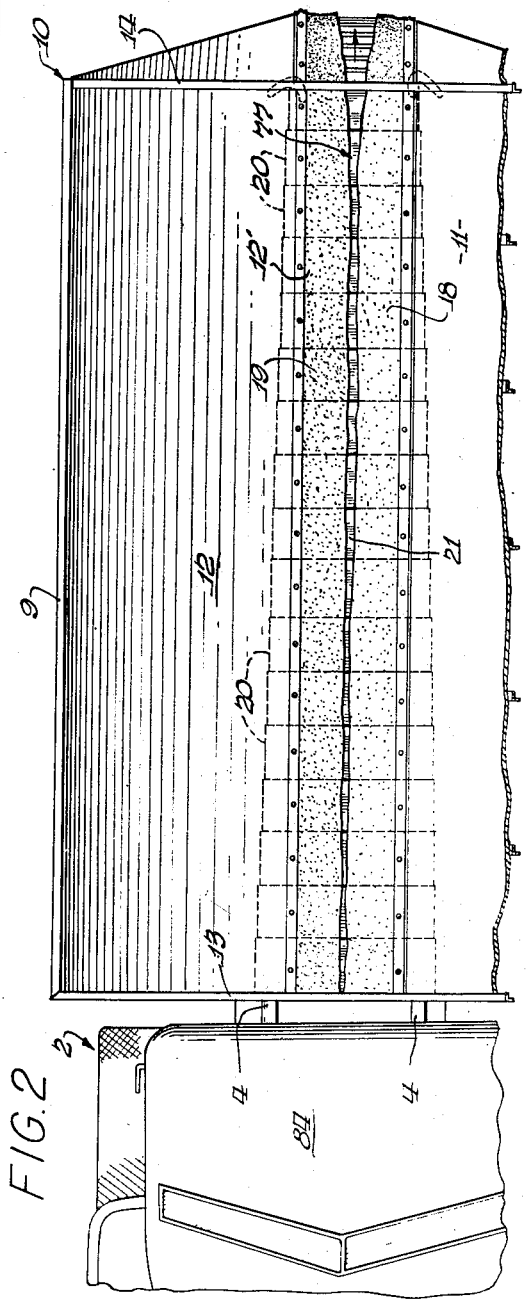
Figure 2 is a fragmentary plan view of the vehicle shown in Figure 1 with the bottom closed.

It will be noted from Figures 2 and 7 that the channel-shaped sections 20, 20 form a closure assembly and telescope into one another from the rearwardmost section into the forwardmost section (that is, from the smallest to the largest), and that the rearwardmost section 20 comprises a pair of outwardly extending arms 45 and 46 which are connected, as by welding, to the flanges 22 and 23 (Figure 7), and the arm 45 rides upon the wall portion 26 of the guide-beam member 28 and the arm 46 rides upon the wall portion 27 of the guide beam 29. The arm 45 has a forward face 47 which is angled forwardly and outwardly and adapted to abut against the rear edges 48 of the sections 20 forwardly of the endmost section 20 as the sections 20 are being telescoped into one another pursuant to sectionally or incrementally opening the discharge slot 12' from the rear end to the forward end of the box in order to positively sequentially telescope each smaller section into the next larger section, as will be readily apparent. It will be seen that in extension, each section 20 will withdraw the section forwardly thereof from the telescoped pile after the sections have been nested into one another (that is, when the discharge opening is fully unclosed) by abutment of its stops 43 with the stops 44 pursuant to the sections being extended by the driving, or operating, mechanism, generally designated 50.

Figure 9:
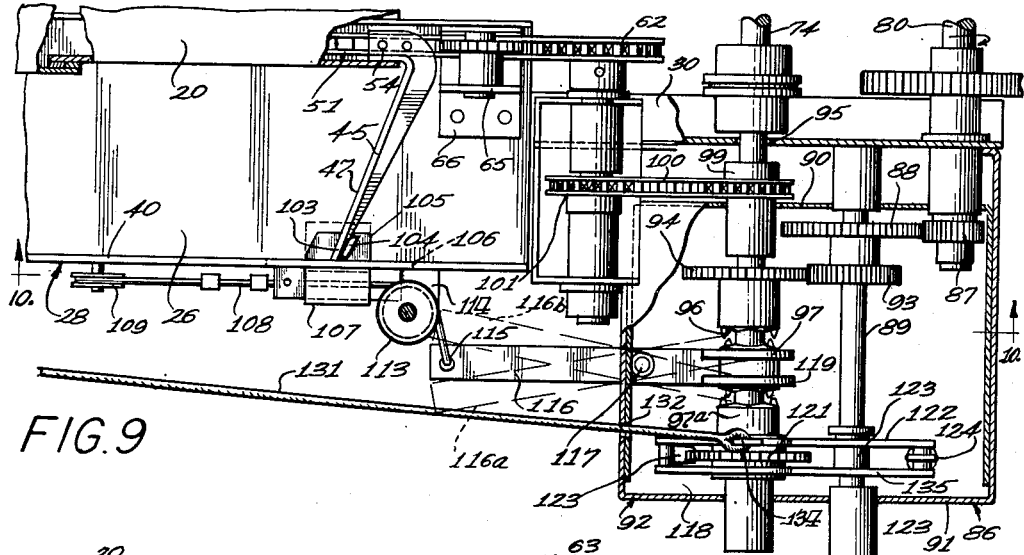
Figure 9 is a plan view of the drive transmission shown partially in horizontal section.
Figure 11:
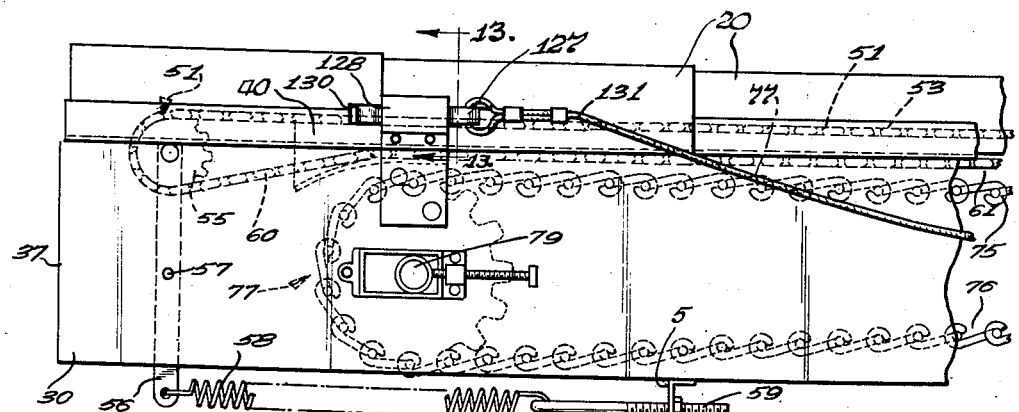
Figure 11 is a fragmentary side view of the front end of the mechanism.

The driving mechanism, as best seen in Figure 12, comprises a pair of endless chains 51 and 52, the chain 51 having an upper run 53 connected, as at 54 (Figure 9), to the arm 45, said run 53 riding on the upper wall 26 of the beam member 28 alongside the flange 40, and at its front end is trained about a sprocket 55 (Figure 11) which is journalled on the upper end of an upright arm 56, the arm being pivoted intermediate its end on a pin 57 carried by the wall 37 of side sill member 30, and the lower end of the arm 57 being hooked to one end of a tension spring 58 which at its other end has an adjustable connection 59 with the adjacent cross-beam member 5 in order to maintain the chain 51 under tension. The chain 51 continues in a lower run 60 which extends through a guide channel 61 connected to the underside of the wall 26 of the left-hand support 28 for the telescoping sections, and the rear end of the chain 51 is trained about a sprocket 62 which is carried on a shaft 63 journalled in a bracket 64 connected to the adjacent side sill member 30. The upper run of this chain is also passed under an idler guide sprocket 65 which is journalled on a bracket 66, also connected to the beam member 28 (Figure 9). It will be observed that the chain 52 is similarly connected to the arm 46 and trained at opposite ends on sprockets 68 and 69, sprocket 69 being connected to a shaft 70 which is connected to a sprocket 71 which is driven by chain 72 trained about a sprocket 73 on an input shaft 74 which extends generally parallel to the shafts 63 and 71 and passes between the upper and lower runs 75 and 76 of an endless conveyor, generally indicated 77, which underlies the closure sections 20 and extends the full length of the slot 12'.

The endless conveyor 77 projects rearwardly of the rear end of the box, or receptacle, 10 and is supported on sprocketed shafts 79 and 80 which are suitably journalled at the forward and rear ends of the walls 33 and 37 of the side beam members 30 and 34.

The apron, or conveyor, 77 is continuously driven with the top run moving rearwardly, as indicated in Figure 12, through a gear box 81 carried on member 34 and driving one end of the shaft assembly 80, and the rear box, which may have meshing bevel gears, is connected to an input shaft 82 which leads to a gear box 83 beneath the cab 84 of the vehicle 2 which is associated in conventional manner, as will be readily understood by those skilled in the art, with the engine (not shown) of the vehicle and the drive is established, or interrupted, with respect to the shafting 82 by means of lever 85 which may be conveniently positioned within the cab of the truck and operate the gears in the box 83.

Figure 10:
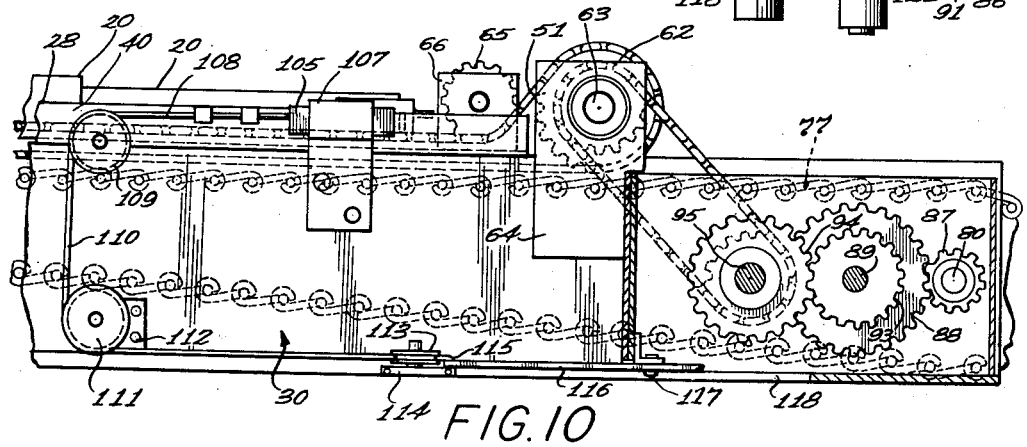
Figure 10 is a sectional view taken substantially on the line 10—10 of Figure 9.

The shaft 80 which at one side of the conveyor terminates in gear box 81, at the opposite side of the conveyor terminates in a gear box 86 which is carried on beam 30 and shaft 80 has keyed thereto a gear 87 which meshes with a gear 88 on a countershaft 89 which is journalled on the walls 90 and 91 of the casing, or housing, 92 of the gear box 86. The gear 88 is constrained for rotation with the shaft 89 as by being keyed thereto, and is connected to a gear 93 which meshes and drives a gear 94 (gears 93, 94 forming a forward driving train) which is freely rotatable on a second countershaft, or output shaft, 95 of the gear box 86 and journalled at opposite ends from the walls 90 and 91 of the gear case 92. The output shaft 94 is provided with a double-jaw clutch 97 which is axially slidable on the shaft 95 and keyed for rotation therewith and adapted in one position to clutchingly engage with the jaw clutch 96 on the gear 94 whereby the shaft 95 is rotated in a direction for rotating the shaft 74 coaxial with shaft 95 and coupled therewith, and the sprockets 99 and 73 keyed thereto in a clockwise direction (Figures 10 and 12) whereby rotating the sprocket 62 through the medium of a chain 100 trained about the sprocket 99 and about the sprocket 101 which is connected to the shaft 63, in a clockwise direction, and therefore advancing the top run 53 of the chain 51 rearwardly; and simultaneously, the clockwise rotation of the shaft 74 drives the sprocket 69 (Figure 12) from the sprocket 73, chain 72, and sprocket 71 whereby simultaneously advancing the top run of the chain 52 rearwardly. This in turn, assuming that the sections 20 are fully telescoped, or even partially telescoped, causes the sections 20 to extend into fully extended position, as shown in Figure 2, whereby closing the entire slot 12' with the plate portions 21 extended in shingle fashion over the top run 75 of the conveyor 77.

It will be noted that the arm 45 which moves along the wall 26 has its outer extremity 103 adjacent to the upright flange 40 of the guide support 28, and this extremity 103 is adapted to engage an abutment 104 (Figure 9) on a sliding member 105 which projects through a slot 106 in the flange 40 and guided for movement longitudinally of the member 28 within a guide 107 connected to the flange 40. The actuator 105 is connected to one end of a cable 108 which is trained about a sheave 109 positioned forwardly of the member 105 and mounted on the flange 40 on a substantially horizontal axis, the cable then having a downwardly extending portion 110 which at its lower end is trained about the forward side of a sheave 111 which is positioned generally parallel to the sheave 109 carried on a bracket 112 from the beam member 30. The cable 110 is continued under the sheave 111, and then about the inner edge of a sheave 113 which is mounted on a substantially vertical axis on a bracket 114, also mounted on the beam member 30, and the cable is continued around the back side of the sheave 113 and is connected, or fastened, as at 115, to the forward end of a horizontally extending arm, or lever, 116 which projects forwardly of the gear case 92 and is pivotally mounted intermediate its ends, as at 117, on a vertical axis from the bottom wall 118 of the gear case, and at its rear end being operatively connected or provided with a shifting fork 119 (Figure 9) for sliding the jaw clutch 97 axially on the shaft 95. It will be observed from Figure 9 that upon the arm 45 reaching a position whereat the rearwardmost section 20 substantially closes the last increment of the slot 12' and with the driving mechanism operating to extend these telescoping sections (that is, with the clutch 97 drivingly associated with the gear 94 whereat the lever 116 is in the dotted position shown at 116a, Figure 9), the rear edge of the end portion 103 of the arm 45 will engage the abutment 104 on the operating member 105 and move it rearwardly within the slot 106 and the guide 107, whereat pulling the cable 108 in the same direction whereby this force is transmitted to the lever 116, and it is moved from the position shown at 116a to the solid-lined neutral position shown in Figure 9, whereupon the drive is immediately interrupted and the gear 94 merely idles about the output shaft 95 of the gear box 86.

Assuming that the bottom is closed, as shown in

Figure 2, in order to sectionally open the bottom, the lever 116 is moved to the position shown at 116b, Figure 9, whereat the clutch 97 is engaged with a companion clutch 97a on a ratchet wheel 121 which is journalled for free rotation on the shaft 95, and the ratchet wheel 121 is associated with an arm assembly 122 which is provided with a spring-pressed pawl 123 which drives the ratchet wheel 121 in a counterclockwise direction, as shown by the arrow in Figure 12, the arm assembly 122 being driven up and down by a crank 123 over which the arm assembly is superposed and constantly urged against by means of a tension spring 124 which is connected to the bottom wall 118 of the gear case, the crank 123 being incorporated in the shaft 89. It will be observed that the ratchet wheel assembly 121, 122, and 123 provides a step-by-step transmission, or reverse driving train, which rotates the shaft 95 and its extension 74 in a counterclockwise direction; and as readily apparent in Figure 12, causes the upper runs of the chains 51 and 52 to advance forwardly whereby the endmost section 20 is telescoped into the next succeeding section forwardly thereof, and they in turn are telescoped into the succeeding sections as aided by arms 45 and 46, and this process continues until all of the sections are telescoped within the forwardmost section; and substantially coincident with this, the end portion 103 of the arm 45 engages on its forward side with an abutment stop 127 of an operating element 128 which is slidably mounted on the flange portion 40 of the guide member 28 in the path of the end portion 103 of the arm 45, and is moved forwardly within the limits of the slot 130 in the flange 40 whereby pulling the cable 131 which has one end fastened to the member 128, the cable 131 extending through an opening 132 in the forward wall of the gear case 92 and having its rear terminal end connected to an upright leg portion 134 (Figures 9 and 12) of the arm assembly 122; and it will be understood that the forward movement of the cable 131 rotates the arm assembly 122 with the rear end portions 135 of the arms which overlie the crank 123 out of engagement therewith whereby interrupting the drive.

In order to again close the bottom, the lever 116 is rotated from the position 116b to the position 116a whereupon the action previously described in connection with the extension of the telescoping sections takes place.

What is claimed is:

1. For use in a self-unloading vehicle having a wheeled chassis and a box supported thereupon with a bottom elongated discharge slot, and a series of closure elements extending transversely of the slot and slidably supported on said box and movable lengthwise of the slot and said elements arranged shingle fashion in the extended position thereof lengthwise of said slot and in superposed relation in the telescoped position thereof at one end of said slot, said series including an endmost element positionable at one end of the slot in extended position thereof and at the other end of the slot in the telescoped position thereof: operating means for extending or telescoping said elements operatively associated therewith, a prime mover, a transmission disposed in driven relation by said prime mover and in driving relation to said operatng means and having a first train for actuating said operating means in a direction telescoping said elements to open the slot and having a second driving train for actuating said operating means in a direction extending said elements to close the slot and said transmission including clutch means having a neutral position for discontinuing drive from said prime mover to either of said driving trains and having a first position for actuating said first train and a second position for actuating said second train, and means including motion transmitting linkage interconnecting said clutch and said endmost closure element and responsive to the positioning of said endmost element for shifting said clutch from said second position to neutral upon said endmost element being disposed at said one end of the slot, and said linkage formed and arranged to prevent shifting of said clutch to said second position when said endmost element is disposed at said one end of the slot.

2. In a self-unloading vehicle having a wheeled chassis and a box supported thereupon with a bottom elongated discharge slot, a pair of side rails supported at opposite sides of said slot therebelow, a series of closure elements extending transversely of the slot and having opposite lateral extremities slidably supported on said rails and movable lengthwise thereof, said elements arranged shingle fashion in the extended position thereof lengthwise of said slot and in superposed relation in the telescoped position thereof at one end of said slot, and operating means for extending or telescoping said elements operatively associated therewith, and said operating means comprising an endless chain movably supported at its extremities adjacent to opposite ends of said slot and connected to an element at one end of said series, transmission means drivingly associated with said chain for moving it in one direction for telescoping said elements and in the opposite direction for extending said elements, and means for automatically interrupting the drive of said transmission means upon said elements being in fully telescoped or fully extended position, and comprising an arm connected to said element at said end of said series and movably supported on a rail for movement longitudinally thereof; an actuating member slidably mounted on said rail at each end thereof for movement lengthwise thereof attendant to engagement by said arm pursuant to movement thereof on said rail; said transmission comprising an output shaft drivingly connected to said endless element; a first driving train connectible with said output shaft for driving it in one direction for moving said chain in a direction telescoping said sections; a second driving train connectible with said output shaft for moving said chain in the opposite direction; means including shifting means operatively associated with said output shaft and said first and second transmissions for selective actuation to connect said first train with said output shaft for telescoping said elements and to connect said second train with said output shaft for extending said elements; and means interconnecting said shifting means with one of said actuating members in the path of said arm when moving with said elements in extension for shifting said shifting means into a neutral position to disconnect said second driving train from said output shaft; and operating means interconnecting the other of said actuating members with said first train for deactivating the latter to interrupt the drive to said chain in the direction telescoping said elements.

3. In a self-unloading vehicle having a wheeled chassis frame supporting an engine and a box with a bottom discharge opening extending lengthwise of the vehicle, an endless conveyor supported on the frame beneath said opening in receiving relation thereto and having a discharge end rearwardly of the box, a plurality of telescoping arranged sectional closure elements supported on said chassis across said opening and arranged in a series lengthwise of said opening and positionable shingle fashion in covering relation to said opening from one end to the other thereof and telescopable to the end of said slot remote from the discharge end of said conveyor to open said opening, said conveyor having a driving shaft extending crosswise thereof at said discharge end thereof and having an operative connection to said engine, a transmission carried by said chassis and comprising a forward driving train and a reverse driving train operatively connected to said conveyor driving shaft, an output shaft, an endless member connected to the endmost closure element of said series and supported adjacent to opposite ends of said opening, drive-transmitting means operatively interconnecting said output shaft with said endless member, and means for selectively connecting said output shaft with either driving train, and including means for disconnecting each driving train from said output shaft, and an operative connection between said last-mentioned means and said endmost element for moving said means to disconnecting position thereof upon said endmost element being disposed at either end of said slot.

4. In a self-unloading vehicle having a wheeled chassis frame supporting a box with a bottom discharge opening extending lengthwise of the vehicle, an endless conveyor supported on the frame beneath said opening in receiving relation thereto and having a discharge end at the rear of the box, a plurality of telescopingly arranged sectional closure elements supported across said opening and arranged in a series lengthwise of said opening and positionable shingle fashion in closing relation to said opening from one end to the other thereof and telescopable to the end of the slot remote from the discharge end of the conveyor to uncover said opening, said conveyor having a driving shaft extending crosswise thereof at said discharge end thereof, a prime mover drivingly connected to said driving shaft, a transmission carried by said chassis and comprising a forward driving train and a reverse driving train and connected to said prime mover in driven relation thereby and having an output shaft, operating means for said elements disposed in driven relation by said output shaft and connected to the endmost element of said series, means for selectively connecting said output shaft with either driving train and including means for disconnecting each driving train from said output shaft, and an operative connection between said last-mentioned means and said endmost element for moving said means to disconnecting position thereof pursuant and in response to said endmost element being disposed at either end of said slot.

References Cited in the file of this patent

UNITED STATES PATENTS

| | | |
|---|---|---|
| 1,122,273 | Hansen | Dec. 29, 1914 |
| 1,928,859 | Kutscha | Oct. 3, 1933 |
| 2,290,950 | Duncan | July 28, 1942 |
| 2,661,104 | Sego | Dec. 1, 1953 |

FOREIGN PATENTS

| | | |
|---|---|---|
| 815,162 | Germany | Nov. 29, 1951 |